United States Patent
Wagner-Kaiser et al.

(10) Patent No.: US 12,361,457 B2
(45) Date of Patent: Jul. 15, 2025

(54) SYSTEM AND METHOD FOR IMPLEMENTING A COMMERCIAL LEAKAGE PLATFORM

(71) Applicant: KPMG LLP, New York, NY (US)

(72) Inventors: Rachel Wagner-Kaiser, Seattle, WA (US); Dylan Kab, Cary, NC (US); James Gardner, Long Beach, CA (US); Martin Kaestner, Bethesda, MD (US); John Hyung Lee, New York, NY (US); David Scripka, Atlanta, GA (US); Ryan Christopher Soileau, Houston, TX (US); Gregory Alexander Vorsanger, Dresher, PA (US); Chenming Xue, Tustin, CA (US)

(73) Assignee: KPMG LLP, New York, NY (US)

( * ) Notice: Subject to any disclaimer, the term of this patent is extended or adjusted under 35 U.S.C. 154(b) by 57 days.

(21) Appl. No.: 17/664,078

(22) Filed: May 19, 2022

(65) Prior Publication Data

US 2022/0374791 A1 Nov. 24, 2022

Related U.S. Application Data

(60) Provisional application No. 63/190,514, filed on May 19, 2021.

(51) Int. Cl.
*G06F 16/93* (2019.01)
*G06Q 10/0875* (2023.01)
*G06Q 30/0283* (2023.01)

(52) U.S. Cl.
CPC ......... *G06Q 30/0283* (2013.01); *G06F 16/93* (2019.01); *G06Q 10/0875* (2013.01)

(58) Field of Classification Search
None
See application file for complete search history.

(56) References Cited

U.S. PATENT DOCUMENTS

| | | | |
|---|---|---|---|
| 7,003,494 B2 * | 2/2006 | Beach | G06Q 40/04 |
| | | | 705/40 |
| 8,140,468 B2 * | 3/2012 | Kwok | G06Q 10/10 |
| | | | 707/600 |

(Continued)

OTHER PUBLICATIONS

D. Baviskar, S. Ahirrao and K. Kotecha, "Multi-Layout Unstructured Invoice Documents Dataset: A Dataset for Template-Free Invoice Processing and Its Evaluation Using AI Approaches," in IEEE Access, vol. 9, pp. 101494-101512. (Year: 2021).*

(Continued)

*Primary Examiner* — Mohammad Z Shaikh
(74) *Attorney, Agent, or Firm* — Hunton Andrews Kurth LLP

(57) ABSTRACT

The invention relates to computer-implemented systems and methods for identifying and further preventing commercial or contract leakage across multiple different procurement relationships. This may involve ingesting a contract extracting commercial terms, such as price, rates, etc. Invoices may be similarly ingested and commercial terms may be extracted on a line item basis. An embodiment of the present invention may identify various types of commercial leakage, such as rate/price discrepancies, full/partial duplication, unrealized discounts, unrealized rebates, disallowance of charges (travel expenses), etc.

20 Claims, 14 Drawing Sheets

(56) References Cited

U.S. PATENT DOCUMENTS

| | | | |
|---|---|---|---|
| 10,599,722 B1* | 3/2020 | Ewing | G06F 16/93 |
| 10,628,471 B2* | 4/2020 | Chandramouli | G06F 16/3344 |
| 10,846,341 B2 | 11/2020 | Cerino et al. | |
| 11,321,364 B2* | 5/2022 | Lee | G06F 16/258 |
| 11,501,549 B2* | 11/2022 | Bade | G06V 30/19167 |
| 11,762,921 B2* | 9/2023 | Benincasa | G06F 40/289 |
| | | | 707/737 |
| 2001/0014880 A1* | 8/2001 | Beach | G06Q 40/02 |
| | | | 705/40 |
| 2002/0161672 A1* | 10/2002 | Banks | G06Q 30/06 |
| | | | 705/26.8 |
| 2003/0215137 A1* | 11/2003 | Wnek | G06V 30/416 |
| | | | 382/181 |
| 2005/0096967 A1* | 5/2005 | Gerrits | G06Q 30/0603 |
| | | | 705/16 |
| 2005/0165681 A1* | 7/2005 | Heinemann | G06Q 10/10 |
| | | | 705/40 |
| 2005/0182736 A1* | 8/2005 | Castellanos | G06F 40/211 |
| | | | 705/80 |
| 2006/0089907 A1* | 4/2006 | Kohlmaier | G06Q 30/04 |
| | | | 705/40 |
| 2009/0222363 A1 | 9/2009 | Arnold et al. | |
| 2013/0054259 A1* | 2/2013 | Wojtusiak | G06Q 10/10 |
| | | | 705/2 |
| 2014/0067633 A1* | 3/2014 | Venkatasubramanian | G06Q 20/102 |
| | | | 705/34 |
| 2015/0012489 A1* | 1/2015 | Ceribelli | G06Q 30/04 |
| | | | 707/611 |
| 2015/0117749 A1* | 4/2015 | Smith | G06V 30/416 |
| | | | 382/137 |
| 2017/0060993 A1* | 3/2017 | Pendar | G06F 16/334 |
| 2017/0147540 A1* | 5/2017 | McCormick | G06F 40/194 |
| 2017/0323006 A1* | 11/2017 | Guzman | G06F 40/186 |
| 2018/0018312 A1* | 1/2018 | Guzman | G06F 16/93 |
| 2019/0087395 A1* | 3/2019 | Priestas | G06F 40/169 |
| 2019/0138519 A1 | 5/2019 | Kavas | |
| 2019/0354720 A1* | 11/2019 | Tucker | G06F 40/295 |
| 2020/0104587 A1* | 4/2020 | Bhatnagar | G06V 30/40 |
| 2020/0133964 A1 | 4/2020 | Lee et al. | |
| 2021/0089589 A1 | 3/2021 | Cerino et al. | |
| 2021/0357633 A1* | 11/2021 | Bade | G06F 40/284 |
| 2022/0122184 A1* | 4/2022 | Jing | G06F 40/194 |
| 2023/0154222 A1* | 5/2023 | Desai | G06N 7/01 |
| | | | 382/100 |

OTHER PUBLICATIONS

International Searching Authority, International Search Report and Written Opinion, International Application No. PCT/US2022/029980, Aug. 19, 2022, pp. 1-8.

* cited by examiner

COMMERCIAL LEAKAGE ANALYSIS
INVOICE DETAILS

Invoice Number
xxx-052597

File Number
5xxxxxxxxx2 incoming
invoice-108_0.json

Vendor Name
ABC Vendor

Invoice Date
9/20/2020

Pricing Effective Date
3/20/2019

Pricing Expiration Date
3/26/2022

Duplicate Spend ($)
$10,043.00

Bill To

Payment Term
Net 30

Late Charge
24% per annum

Unrealized Discounts ($)
$0.00 xxx-06xx97    $10,043.00
xxx-05xx54 email address

| Description | Quantity | Unit Price | Item Cost | GBT | Subtotal | Invoice Total | Duplicate Item Flag | Volume Discount | Rate Discrepancy Amount ($) | Item Cost Discrep Amount ($ POS) | Unrealized Discount Speed ($) |
|---|---|---|---|---|---|---|---|---|---|---|---|
| 35 TON RENTAL | 9 | $164.00 | $1,476.00 | $553.33 | $5,132.00 | $11,619.83 | TRUE | FALSE | $0.00 | $0.00 | $0.00 |
| 85 TON RENTAL | 9 | $261.00 | $2,349.00 | $553.33 | $5,132.00 | $11,619.83 | TRUE | FALSE | $0.00 | $0.00 | $0.00 |
| MANBASKET | 1 | $85.00 | $85.00 | $553.33 | $11,066.50 | $11,619.83 | TRUE | FALSE | $0.00 | $0.00 | $0.00 |
| RIGGER | 9 | $58.50 | $526.60 | $553.33 | $11066.50 | $11,619.83 | TRUE | FALSE | $0.00 | $0.00 | $0.00 |
| TRAVEL PREMIUM | 10 | $58.50 | $585.00 | $553.33 | $11,066.50 | $11,619.83 | TRUE | FALSE | $0.00 | $0.00 | $0.00 |

Download Invoice        Download Contract

Figure 6

| Original | Text | Table Detection | Lume | Extraction Results |

+New Files | Process

- 2013-00050 1 (Signed) Master Agreement 03-30-13 - signed.pdf
- Example WC MedRec.pdf
- Invoice 1.pdf

*Original*

Supplier 1
123 Madison Drive, Seattle, WA 78290
Supplier1@supplier.com
900-120-5555

INVOICE

Invoice No.: 45xxxxx34
Invoice Date: 10/31/2019
Due Date: 11/30/2019

BILL TO
Alan Smith
11 Main Street, Seattle, WA
allen@customer.com
990-302-5555

| DESCRIPTION | QTY/HR | UNIT PRICE | TOTAL |

Delete File | Download

Figure 7

| Original | Text | Table Detection | Lume | Extraction Results |

+New Files | Process

☐ 2013-00050 1 (Signed) Master Agreement 03-30-13 - signed.pdf
☐ Example WC MedRec.pdf
☐ Invoice 1.pdf Delete File | Download

*Original*

BILL TO
Alan Smith
11 Main Street, Seattle, WA
allen@customer.com
990-302-5555

Invoice No.: 45xxxxx34
Invoice Date: 10/31/2019
Due Date: 11/30/2019

| DESCRIPTION | QTY/HR | UNIT PRICE | TOTAL |
|---|---|---|---|
| Technical Delivery Manager | 28 | 200.00 | 5600.00 |
| Architect | 42 | 195.00 | 8190.00 |
| Project Manager | 40 | 190.00 | 7600.00 |
| Process Designer | 40 | 250.00 | 10000.00 |
| UAT Tester | 40 | 180.00 | 7200.00 |

SUBTOTAL 38590.00
DISCOUNT 0.00
SUBTOTAL LESS DISCOUNT 38590.00
TAX RATE 12.00%
TOTAL TAX 4630.80
Balance Due $43,220.80

Tank you for your business!

Terms & Instructions
Payment Terms: Net 30

+ New Files | Process

- 2013-00050 1 (Signed) Master Agreement 03-30-13 - signed.pdf
- Example WC MedRec.pdf
- Invoice 1.pdf Delete File | Download Original | Text | Table Detection | Lume | Extraction Results

*Text*

Supplier 1
123 Madison drive, Seattle, WA 78290
Supplier1@supplier.com
990-120-5555

INVOICE

BILL TO Invoice NO. 45101139895
Allen Smith Invoice Date 10/31/2019
11 Main St, Seattle WA Due Date 11/30/2019
allen@customer.com
990-302-5555

DESCRIPTION QTY/HR UNIT PRICE TOTAL
Technical Delivery Manager 28 200.00 5600.00
Architect 42 195.00 8190.00
Project Manager 40 190.00 7600.00
Process Designer 40 250.00 10000.00
UAT test 40 180.00 7200.00
SUBTOTAL 38590.00
DISCOUNT 0.00
SUBTOTAL LESS DISCOUNT 38590.00
Tank you for business
TAX RATE 12.00%
TOTAL TAX 4630.80

Terms | Instructions
Payment Terms Net 30

Balance Due $43,220.80

Show Legend

| Tag | Description | Example |
|---|---|---|
| ADJ | adjective | big, old, green, first |
| ADP | adposition | in, to, during |
| ADV | adverb | very, tomorrow, down |
| AUX | auxiliary | is, has (done), will (do) |
| CCONJ | conjunction | and, or, but |
| | coordinating conjunction | and, or, but |
| DET | determiner | a, an, the |
| INTJ | interjection | psst, ouch, bravo, hello |
| NOUN | noun | girl, cat, gree, air |
| NUM | numerical, carinal | 1, 2017, one, seventy-seven |
| PART | participle | 's, not |
| PRON | pronoun | I, you, he, she, myself |
| PROPN | proper noun | Mary, John, London, NATO |
| PUNCT | punctuation | ., (, ), ? |
| SCONJ | subordinating conjunction | if, white, that |

| Original | Text | Table Detection | Lume | Extraction Results | | +New Files |
|---|---|---|---|---|---|---|
| | | | | | | 2013-00050 1 (Signed) Master Agreement 03-30-13 - signed.pdf |
| | | | | | | Example WC MedRec.pdf |
| | | | | | | Invoice 1.pdf |

*Table Detection*

BILL TO
Alan Smith
11 Main Street, Seattle, WA
allen@customer.com
990-302-5555

Invoice No.: 45xxxxx34
Invoice Date: 10/31/2019
Due Date: 11/30/2019

| DESCRIPTION | QTY/HR | UNIT PRICE | TOTAL |
|---|---|---|---|
| Technical Delivery Manager | 28 | 200.00 | 5600.00 |
| Architect | 42 | 195.00 | 8190.00 |
| Project Manager | 40 | 190.00 | 7600.00 |
| Process Designer | 40 | 250.00 | 10000.00 |
| UAT Tester | 40 | 180.00 | 7200.00 |
| | | | |

1010

| | | |
|---|---|---|
| | SUBTOTAL | 38590.00 |
| | DISCOUNT | 0.00 |
| | SUBTOTAL LESS DISCOUNT | 38590.00 |
| | TAX RATE | 12.00% |
| | TOTAL TAX | 4630.80 |
| | Balance Due | $43,220.80 |

Thank you for your business!

Terms & Instructions

[ Process ]  [ Download ]  [ Delete File ]

Figure 10

[+New Files]  [Process]

2013-00050 1 (Signed) Master
Agreement 03-30-13 - signed.pdf
Example WC MedRec.pdf
Invoice 1.pdf

[Delete File]  [Download]

---

Original  Text  Table Detection  [Lume]  Extraction Results

*Lume Viewer*

*payment_terms* ○

*invoice_due_date* ◉

*tax_rate* ○

*tax_amount* ○

*subtotal* ◉

*invoice_total* ◉

*supplier* ○

Supplier1@supplier.com
900-120-5555

BILL TO
Alan Smith
11 Main Street, Seattle, WA
allen@customer.com
990-302-5555

Invoice No.: 45XXXXXX34
Invoice Date: 10/31/2019
Due Date: 11/30/2019

| DESCRIPTION | QTY/HR | UNIT PRICE | TOTAL |
|---|---|---|---|
| Technical Delivery Manager | 28 | 200.00 | 5600.00 |
| Architect | 42 | 195.00 | 8190.00 |
| Project Manager | 40 | 190.00 | 7600.00 |
| Process Designer | 40 | 250.00 | 10000.00 |
| UAT Tester | 40 | 180.00 | 7200.00 |

SUBTOTAL  38590.00
DISCOUNT  0.00
SUBTOTAL LESS DISCOUNT  38590.00
TAX RATE  12.00%
TOTAL TAX  4630.80
Balance Due  $43,220.80

Tank you for your business!

Terms & Instructions
Payment Terms: Net 30

Figure 11

| Original | Text | Table Detection | Lume | Extraction Results |

| +New Files | | Process |
|---|---|---|
| 2013-00050 1 (Signed) Master Agreement 03-30-13 - signed.pdf | | |
| Example WC MedRec.pdf | | |
| Invoice 1.pdf | | |

*Lume Viewer*

*invoice_data* ☐
*payment_terms* ☐
*invoice_due_date* ⊙
*tax_rate* ⊙
*tax_amount* ☐
*subtotal* ☐
*invoice_total* ☐
*supplier* ☐

Supplier 1
123 Madison drive, Seattle, WA 78290
Supplier1@supplier.com
900-120-5555

INVOICE

BILL TO
Alan Smith
11 Main Street, Seattle, WA
allen@customer.com
990-302-5555

Invoice No.: 45xxxxx34
Invoice Date: 10/31/2019
Due Date: 11/30/2019

| DESCRIPTION | QTY/HR | UNIT PRICE | TOTAL |
|---|---|---|---|
| Technical Delivery Manager | 28 | 200.00 | 5600.00 |
| Architect | 42 | 195.00 | 8190.00 |
| Project Manager | 40 | 190.00 | 7600.00 |
| Process Designer | 40 | 250.00 | 10000.00 |
| UAT Tester | 40 | 180.00 | 7200.00 |

Tank you for your business!

SUBTOTAL 38590.00
DISCOUNT 0.00
SUBTOTAL LESS DISCOUNT 38590.00
TAX RATE 12.00%
TOTAL TAX 4630.80
Balance Due $43,220.80

Terms & Instructions
Payment Terms: Net 30

| Delete File | | Download |
|---|---|---|

Figure 12

| +New Files | | Original Text  Table Detection  Lume | Extraction Results | |
|---|---|---|---|---|
| 📄 2013-00050 1 (Signed) Master Agreement 03-30-13 - signed.pdf | Process | *Extraction Results* | | |
| 📄 Example WC MedRec.pdf | | Field | Answer | |
| 📄 Invoice 1.pdf | | Supplier Name | Supplier 1 | |
| | | Contract | 2013-00369 1 (Signed) SOW May 2013 | |
| | | File Name | Invoice 1 | |
| | | Invoice Number | 4xxxxx5.0 | |
| | | Supplier Name 1 | Supplier 1 | |
| | | Customer Name | Customer | |
| | | Service Description | Business Process / Case Management | |
| | | Service Period Start | 2019-10-01 00:00:00 | |
| | | Service Period End | 2019-10-31 00:00:00 | |
| | | Invoice Date | 2019-10-31 00:00:00 | |
| | | Invoice Due Date | 2019-11-30 00:00:00 | |
| | | Net Payment Terms | Net 30 | |
| | | Currency | USD | |
| | | Tax Rate % | 0.12 | |
| | | Tax Amount $ | 4630.8 | |
| | | Previous  Page 1 of 1 | 25 rows | Next |
| Delete File | Download | | | |

Figure 13

SYSTEM AND METHOD FOR IMPLEMENTING A COMMERCIAL LEAKAGE PLATFORM

CROSS-REFERENCE TO RELATED APPLICATION

This application claims priority to U.S. Provisional Application Ser. No. 63/190,514, filed May 19, 2021, the contents of which are incorporated by reference herein in their entirety.

This application is related to U.S. patent application Ser. No. 17/100,019, filed on Nov. 20, 2020, which is a continuation application of U.S. patent application Ser. No. 16/159,088, filed on Oct. 12, 2018, now U.S. Pat. No. 10,846,341, which claims the benefit of U.S. Provisional Patent Application Ser. No. 62/572,266, filed on Oct. 13, 2017, the contents of which are incorporated by reference herein in their entirety.

This application is related to U.S. patent application Ser. No. 16/730,131, filed on Dec. 30, 2019, now U.S. Pat. No. 11,321,364, which is a continuation-in-part application of U.S. patent application Ser. No. 16/159,088, filed on Oct. 12, 2018, now U.S. Pat. No. 10,846,341, which claims the benefit of U.S. Provisional Patent Application Ser. No. 62/572,266, filed on Oct. 13, 2017, the contents of which are incorporated by reference herein in their entirety.

FIELD OF THE INVENTION

The present invention relates to systems and methods for automatically detecting and preventing commercial leakage.

BACKGROUND

It is common for an entity to engage in commercial contracts with various vendors, suppliers, contractors, etc. Depending on the size and business, the entity may engage in several contracts to hundreds and hundreds of different commercial contracts. Each contract has a corresponding set of commercial terms which may be supported by a large volume of supplier contracts, addendums, purchase orders, pricing sheets, statements of work, change orders and invoices. As commercial terms and pricing are becoming more and more complex, it becomes increasingly difficult if not impossible to stay on top of each and every commercial term, discount, pricing arrangement, payment term, etc.

Procurement teams oftentimes use creative pricing solutions for services, materials, rental equipment, etc. This may include rate cards as well as negotiation of special discounts and prices. For example, a discount may be applied at the end of a project or term based on volume and/or other conditions. In addition, rebates, such as an annual rebate, may be applied if a certain threshold is reached. By spending a first threshold amount, a rebate of a certain percentage (e.g., 2%) may be applied. If a higher threshold is spent, an even greater discount can be achieved. Such pricing solutions provide cost savings but can get very complex and difficult to manage and enforce.

To fully understand a relationship, a comparison of the invoice and the contract would need to be performed on a line item by line item basis. This process is further complicated with each contract and invoice being unique to a particular entity. Accordingly, the process is manually intensive and tedious with little to no standardization. At best, this process may identify some discrepancies but does not prevent such inconsistencies from occurring.

Oftentimes, invoices that are considered low-value are not reviewed and therefore result in unrealized benefits such as early payment discounts, etc. However, such low-value invoices can quickly add up and result in significant lost opportunities.

It would be desirable, therefore, to have a system and method that could overcome the foregoing disadvantages of known systems and that could apply automated detection and prevention of commercial leakage. This provides substantial savings in resources and promotes efficiencies currently unavailable with existing solutions.

SUMMARY

According to an embodiment, the invention relates to a computer-implemented system for analyzing data from a variety of data sources and determining commercial leakage. The system comprises: an interface coupled to a plurality of data sources comprising structured data and unstructured data; a memory component that stores and manages contracts and invoices relating to one or more service providers; and a computer server comprising a computer processor and coupled to the interface and the memory component, the computer processor configured to perform the steps of: receiving, via the interface, contract data relating to one or more contracts; receiving, via the interface, invoice data relating to one or more invoices; extracting a first set of one or more commercial terms from the received contract data; extracting a second set of one or more commercial terms from the received invoice data; converting the first set of one or more commercial terms into a standardized data format; converting the second set of one or more commercial terms into the standardized data format wherein the standardized data format is applicable to a plurality of disparate service providers and includes at least one element wherein the at least one element includes an element identifier and an element type and is stored in a non-hierarchical relationship format to other elements; based on the standardized data format, performing, via an artificial intelligence process, a comparison of the one or more commercial terms to determine one or more differences between contract commercial terms and invoice commercial terms; generating an output identifying the one or more differences between contract commercial terms and invoice commercial terms, wherein the output comprises one or more of: an automated response to address the difference and a notification to a subject matter professional; and responsive to the output, receiving feedback from one or more of: the automated response and the subject matter professional, wherein the feedback is applied to the computer processor in performing the comparison of the one or more commercial terms.

According to another embodiment, the invention relates to a computer-implemented method for analyzing data from a variety of data sources and determining commercial leakage. The method comprises the steps of: receiving, via an interface, contract data relating to one or more contracts, wherein the interface is coupled to a plurality of data sources comprising structured data and unstructured data; receiving, via the interface, invoice data relating to one or more invoices; extracting a first set of one or more commercial terms from the received contract data; extracting a second set of one or more commercial terms from the received invoice data; converting the first set of one or more commercial terms into a standardized data format; converting the second set of one or more commercial terms into the standardized data format wherein the standardized data format is applicable to a plurality of disparate service providers and includes at least one element wherein the at least one element includes an element identifier and an element type and is stored in a non-hierarchical relationship format to other elements; based on the standardized data format, performing, via an artificial intelligence process, a comparison of the one or more commercial terms to determine one or more differences between contract commercial terms and invoice commercial terms; generating an output identifying the one or more differences between contract commercial terms and invoice commercial terms, wherein the output comprises one or more of: an automated response to address the difference and a notification to a subject matter professional; and responsive to the output, receiving feedback from one or more of: the automated response and the subject matter professional, wherein the feedback is applied to the computer processor in performing the comparison of the one or more commercial terms.

An embodiment of the present invention performs a comparison on extracted commercials terms in an automated and efficient manner. An embodiment of the present invention identifies discrepancies and highlights potential issues for a subject matter professional to review. By implementing a standardized data model, an embodiment of the present invention is able to accurately compare commercial terms from what was agreed to and what was delivered. The standardized data model further enables comparisons to be made more accurately across various vendors, relationships and/or entities. The innovative commercial leakage platform is able to realize significant cost savings and ensure commercial terms are applied correctly and consistently across various service providers.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 illustrates an exemplary interface for providing commercial leakage analysis and drill down level details.

FIG. 7 is an exemplary invoice view, according to an embodiment of the present invention.

FIG. 8 is an exemplary view of line item details, according to an embodiment of the present invention.

FIG. 9 is an exemplary view of extracted text, according to an embodiment of the present invention. Text and corresponding tags are graphically shown.

FIG. 10 is an exemplary view of table detection, according to an embodiment of the present invention.

FIGS. 11 and 12 are an exemplary view of Lume data, according to an embodiment of the present invention.

FIG. 13 is an exemplary view of extraction results, according to an embodiment of the present invention.

DETAILED DESCRIPTION

Figure 1:
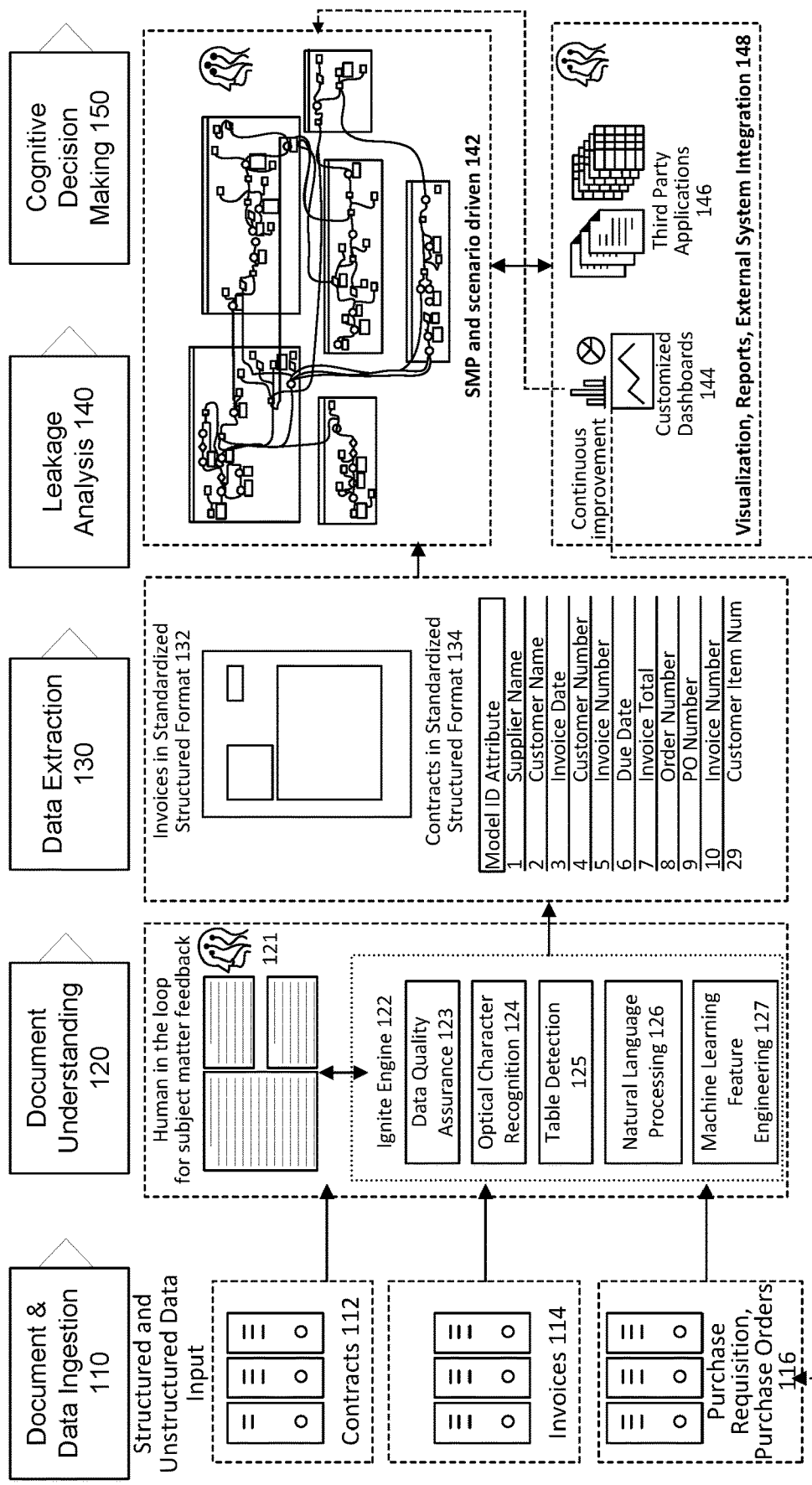
FIG. 1 is an exemplary illustration of a commercial leakage platform, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a commercial leakage platform that identifies and further prevents commercial or contract leakage across multiple different procurement relationships. Commercial leakage generally represents a difference between what was agreed to and what was delivered. The agreed to terms are normally represented through a contract or other agreement. The deliverables may be detailed in an invoice or other charge statement. According to an embodiment of the present invention, the commercial leakage platform may ingest contracts and then extract commercial terms, such as price, rates, etc. Invoices may be similarly ingested and commercial terms may be extracted on a line item basis. Invoices may identify professional services, breakdown of charges and other line item details. An embodiment of the present invention is directed to identifying various types of commercial leakage, such as rate/price discrepancies, full/partial duplication, unrealized discounts, unrealized rebates, disallowance of charges (travel expenses), etc.

An embodiment of the present invention implements a standardized data model to compare commercial terms from what was agreed to and what was delivered. When data is extracted from invoices and contracts, the extracted data may be formatted into a standardized data model. This enables comparisons to be made more accurately across various vendors, relationships and entities.

The compared information and supporting analytics may be provided to users through an interactive interface, such as a dashboard. For example, based on the comparison, a discrepancy may be identified and then communicated through the dashboard. In addition, the dashboard may communicate an identification of an issue and supporting evidence/documentation that would serve as a basis to request a new invoice or other resolution. Other modes of communication may be supported.

An embodiment of the present invention may perform a comparison and analysis for past invoices. In this scenario, any identified discrepancies may be resolved through a resolution, such as a request to reissue the invoice for the correct amount. Another resolution may involve requesting a refund for the discrepancy. In another scenario, the comparison and analysis may be performed prior to payment on the invoice. Here, an embodiment of the present invention may be integrated with a client system so that when an invoice is received, it may be compared against the contract and adjusted if necessary before the invoice is paid. Upon identifying discrepancies in prices or other terms, an embodiment of the present invention may generate a stop payment to prevent the invoice from being paid.

With a Standardized Data Model, the commercial leakage platform may be applied to any client, in any industry and for any type of procurement including professional services, procurement of goods, equipment, etc. The standardized data model may normalize commercial terms in a manner that supports comparisons across various industries, vendors, systems, platforms, etc. For example, the standardized data model may facilitate translating commercial terms such as quantity, hours, weight and number of items into a unit price or other common metric to support more accurate and even comparisons.

An embodiment of the present invention recognizes that human reviews and audits can only process a limited number of invoices with limited accuracy. Current manual reviews are time consuming, prone to errors and fail to prevent and even adequately address commercial leakage. According to an embodiment of the present invention, the commercial leakage platform effectively automates an entire commercial leakage process and focuses human specialists on actual issues. When integrated with a billing process, the commercial leakage platform may stop payments to prevent erroneous invoices from being paid. Other actions may be identified and implemented.

FIG. 1 is an exemplary illustration of a commercial leakage platform, according to an embodiment of the present invention. The commercial leakage platform may include components and implement data flows that include data conversion, feature engineering, business rules and output. As shown in FIG. 1, an exemplary data flow may include Document and Data Ingestion 110; Document Understanding 120; Data Extraction 130; Leakage Analysis 140 and Cognitive Decision Making 150. An embodiment of the present invention is directed to aggregating content from multiple disparate platforms and siloed data sources, establishing and applying a common taxonomy and classification and further continuously analyzing millions and millions of third party transactions providing real-time insights on spend, risk and performance.

Document and Data Ingestion 110 may receive structured and unstructured data from various sources including Contracts 112, Invoices 114, Purchase Requisition, Purchase Orders, represented by 116, and other documents and data. Combining data from unstructured sources (e.g., contracts and invoices) with structured data allows the generation of new business insights. An embodiment of the present invention may realize these business insights through data extraction and analysis.

Document Understanding 120 may enable subject matter experts and professionals to provide subject matter feedback through an embodiment of the present invention, as shown by 121. Document Understanding 120 may leverage technology described in U.S. Pat. No. 10,846,341, which is incorporated herein by reference. For example, an Ignite Engine 122, as described in U.S. Pat. No. 10,846,341, may include Data Quality Assurance Module 123, Optical Character Recognition (OCR) Processor 124, Table Detection Module 125, Natural Language Processing (NLP) 126, and Machine Learning and Feature Engineering Module 127. For example, NLP 126 enables the ability to understand the meaning of text based on trained subject matter expertise.

Data Extraction 130 may involve extracting data from various sources of data including contract files, invoices, inventory and accounting systems, etc. Contract files may represent master service agreements, addendums, statement of work, change orders, pricing sheets, etc. Extracted data may include commercial terms, pricing discounts, payments terms, etc. From invoices, extracted data may include items purchased, quantity, prices, discounts, etc. From inventory and accounting systems, data extracted may include items received, quantity, date, etc.

The extracted data may then be transformed into a Standardized Structured Format. As shown by 130, invoices may be converted into a standardized structured format, as shown by 132. In addition, contracts may be transformed into a (corresponding) standardized structured format, as shown by 134. The standardized structured formats may be similar but may not be exactly the same. For example, a contract data model may include a valid start date and an end date for each entry, while an invoice data model may have a specific invoice date that will be checked against the contract data model start/end date range. For example, model attributes may include supplier name, customer name, invoice date, customer number, invoice number, due date, invoice total, order number, purchase order (PO) number, invoice number, customer item number, etc.

The Standardized Structured Format may be realized as a common data format, such as Lume described in U.S. Pat. No. 10,846,341, the description of which is incorporated herein by reference.

An embodiment of the present invention is directed to automating and standardizing the commercial leakage process. Standardization enables different scenarios to run off of a standardized model. With the standardized data model, an embodiment of the present invention is able to make comparisons across various procurement categories. For example, equipment may be rented based on various units, e.g., by the minute, hour, day, week, etc. A standardized data model is able to convert each organization's invoice and/or contract into a standardized format, model and structure.

Leakage Analysis 140 and Cognitive Decision Making 150 features and functions may be realized through Commercial Leakage Analysis which may be SMP (subject matter professional) and Scenario driven, as shown by 142, and may further support Visualization, Reports and External system integration, as shown by 148. Through the standardized data model, an embodiment of the present invention is able to provide customized dashboards 144 to various end users, organizations, clients and other recipients. An embodiment of the present invention may support third party applications 146. Cognitive Decision Making 150 generates decisions and provides answers to questions, produces insights and identifies patterns and anomalies. For example, an embodiment of the present invention may determine where unbalanced amounts exist and provide cognitive remediation recommendations.

Analytics and data engineering may be applied to the extracted data. This may involve matching and comparing data; calculating discounts and prices based on contract terms; comparing calculations based on contract terms to actual terms; and comparing invoice details to inventory records, etc.

Insights may be represented as analytical results and business insights, such as determinations relating to whether the correct amount was paid; whether an entity received what was invoice and paid; whether duplicate invoice and payments exist and whether discounts were applied correctly.

An embodiment of the present invention is directed to providing summary dashboards relating to commercial leakage reporting. Summary dashboards enable analysis by service type, supplier, geography, leakage type, amounts, etc.

An embodiment of the present invention performs a comparison on extracted commercial terms in an automated and efficient manner. An embodiment of the present invention may identify discrepancies and potential issues for a subject matter professional to review. With this process, the subject matter professional may review discrepancies and provide feedback. Upon review, the subject matter professional may overrule the potential issue. In this example, the subject matter professional feedback may be provided to the commercial leakage platform. An embodiment of the present invention may apply thresholds in determining when and/or whether to raise issues to a subject matter professional or simply resolve issues automatically. For example, if certain discrepancies are below a threshold, the commercial leakage platform may be automatically resolved. If the discrepancies are above a threshold, a client may be alerted with a notification and a request for approval and/or action. Other customized actions/responses may be applied.

An embodiment of the present invention may implement a learning feature as applied to the commercial leakage platform for continuous improvement. With the learning feature, an algorithm may be updated and further refined based on feedback. For example, a system may have misinterpreted commercial terms from a contract because supporting data was missed, e.g., a footnote that allowed for a particular charge was overlooked. Based on this feedback, an embodiment of the present invention may update the algorithm, e.g., extract data from footnotes. Other adjustments based on feedback may be applied to the commercial leakage platform.

Figure 2:
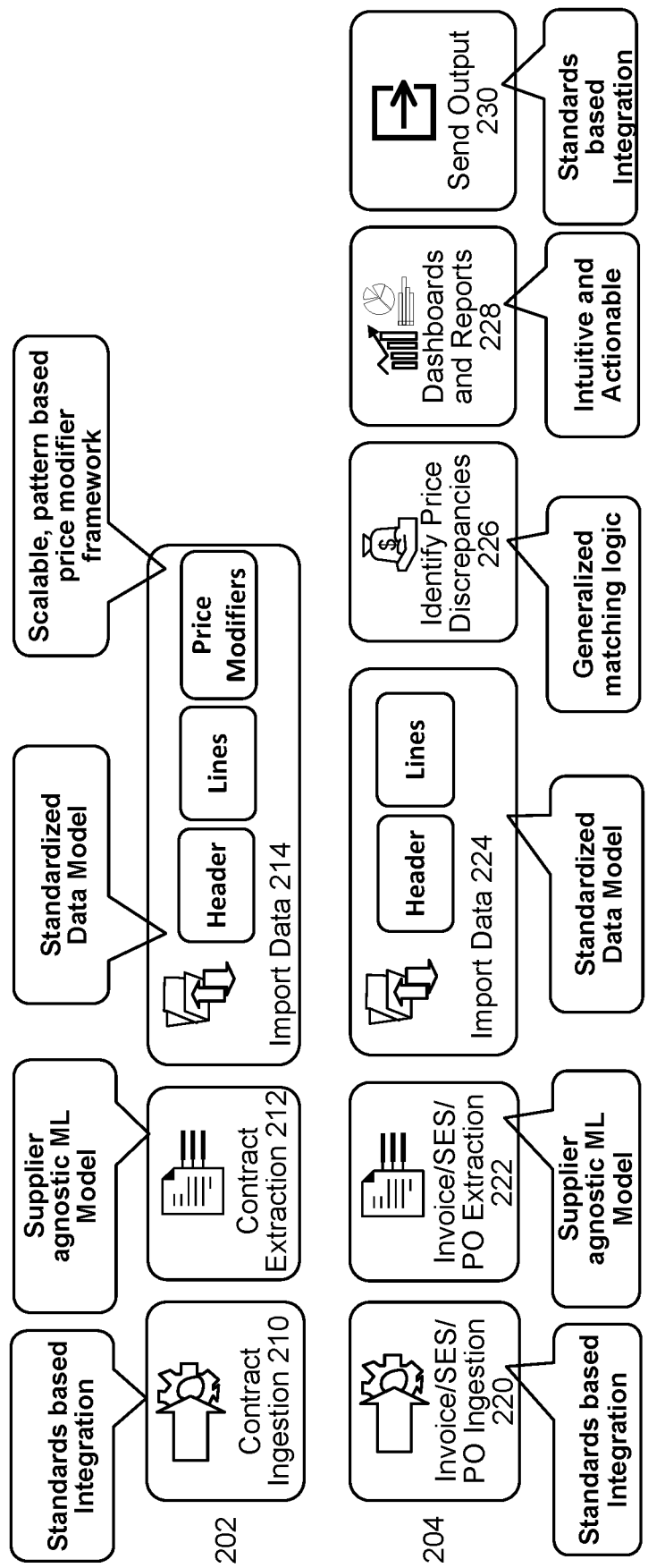
FIG. 2 is an exemplary flow diagram, according to an embodiment of the present invention.

FIG. 2 is an exemplary flow diagram, according to an embodiment of the present invention. FIG. 2 illustrates a scalable and intuitive platform that provides standards based integration, machine learning (ML) models, standardized data model, pattern based price modifier framework and generalized contract line matching logic. According to an exemplary illustration, FIG. 2 shows contract integration 202 and invoice integration 204.

Contract integration 202 may include Contract Ingestion 210, Contract Extraction 212 and Data Importation 214. Contract Ingestion 210 includes standards based integration. Contract Extraction 212 is based on a supplier agnostic ML model. Data Importation, as shown by 214, is based on a standardized data model and a scalable pattern based price modifier framework. An embodiment of the present invention is directed to applying price modifiers to the standardized data model. Price modifiers may be based on certain factors and variables including location, index prices, etc.

Invoice integration 204 may include Invoice Ingestion 220, Invoice Extraction 222, Data Importation 224, Price Discrepancies Identification 226, Dashboards and Reports 228 and Output Transmission 230.

Invoice Ingestion 220 includes standards based integration. Invoices are one example, data ingestion may apply to purchase orders, service entry sheets (SES), etc. Invoice Extraction 222 is based on a supplier agnostic ML model. Data Importation 224 is based on a standardized data model. Price Discrepancies Identification 226 may apply a generalized matching logic. Dashboards and Reports 228 provide data in an intuitive and actionable manner/format. Output Transmission 230 may include standards based integration. The output may be sent to various recipients and receiving systems in multiple formats.

Input data may include data from various documents and sources including contract files, contract metadata, invoice files, invoice Enterprise resource planning (ERP) data, service entry files, service entry sheets (SES), ERP data, purchase order (PO) ERP data, remittance metadata, etc. External data may be ingested as well, including market indices, etc. Outputs may be consumed by multiple stakeholders leveraging multiple systems and communications.

Figure 3A:
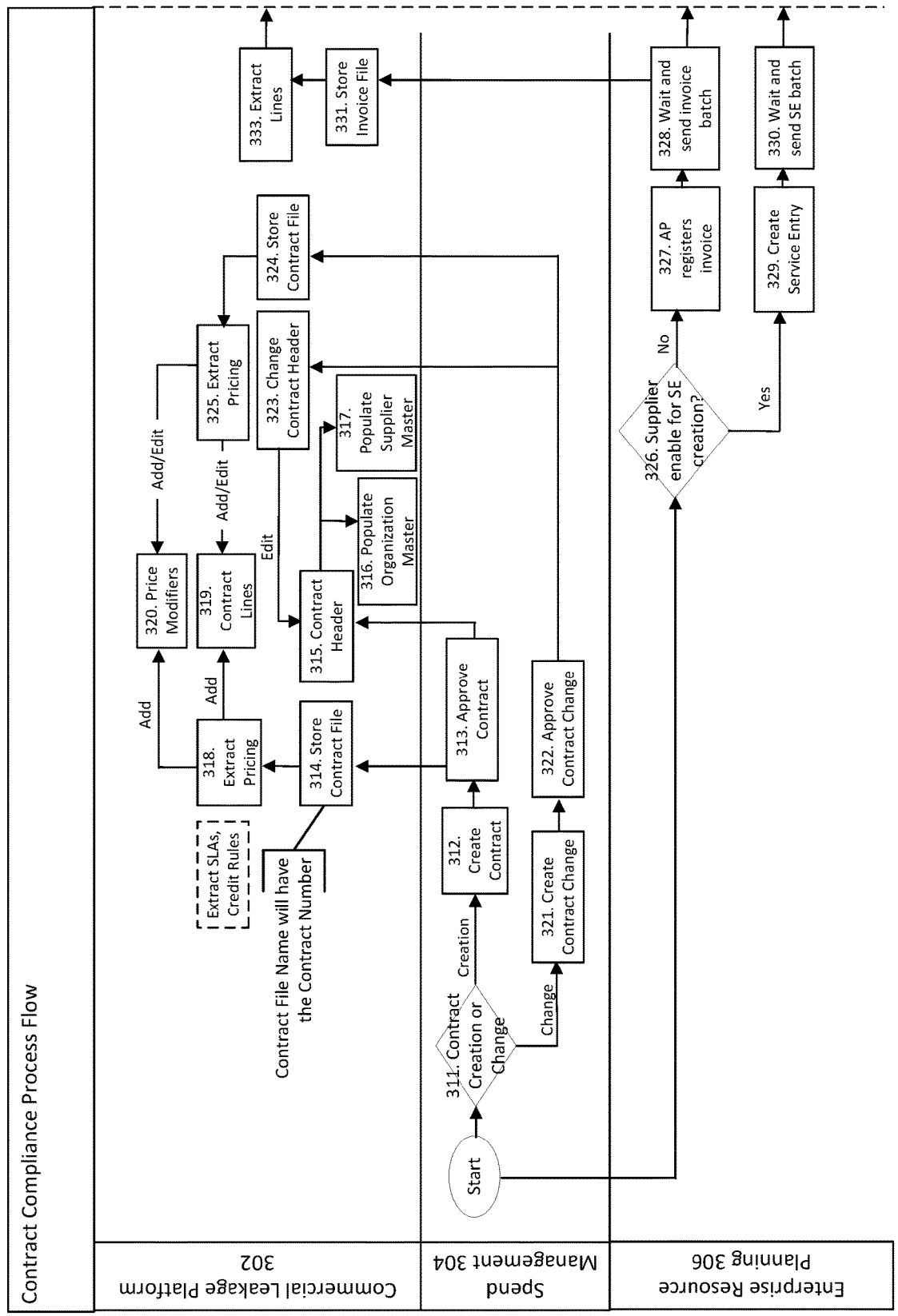
FIGS. 3A and 3B illustrate a detailed process flow, according to an embodiment of the present invention.
Figure 3B:
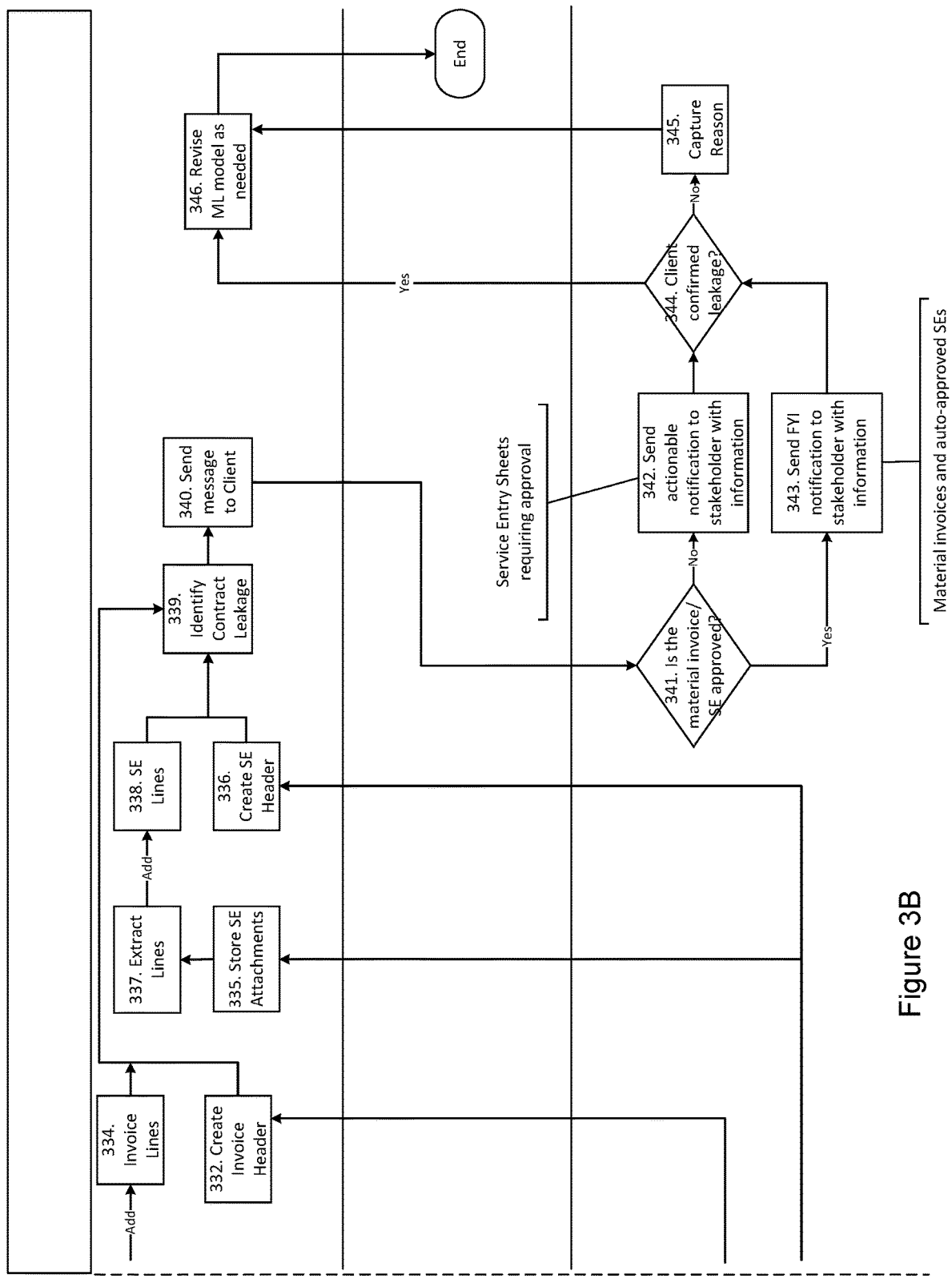

FIGS. 3A and 3B illustrate a detailed process flow, according to an embodiment of the present invention. FIGS. 3A and 3B show where the different data originates and how the data flows through multiple systems. In addition, FIGS. 3A and 3B highlight the points of system automation and instances where human intervention may be realized to enable identification of contract leakage and presentation to stakeholders intuitively. The exemplary contract compliance process flow further illustrates interactions between Commercial Leakage Platform 302, Spend Management 304 (e.g., Ariba, etc.) and Enterprise Resource Planning 306 (e.g., SAP/Open Text, etc.).

An exemplary process starts at creating or changing a contract (step 311). Contract creation (step 312) may include an approval step (step 313). Commercial Leakage Platform 302 may store the contract file (step 314) and extract data such as pricing (step 318). This data may be added as price modifiers (step 320) and contract lines (step 319). Contract header data may be extracted (step 315) and used to populate an organization master (step 316) and a supplier master (step 317).

A contract change process may be initiated (step 321) and approved (step 322). Contract header may be changed (step 323) and edited. Contract file may be stored (step 324) and pricing data may be extracted (step 325). Pricing data may be added or edited via price modifiers (step 320) and contract lines (step 319).

An entity (such as enterprise resource planning software or platform represented by 306) may determine whether a supplier is enabled for service entry (SE) creation (step 326). If not, Accounts Payable (AP) registers the invoice (step 327) and sends an invoice batch (step 328). Payload may include invoice PDF, invoice header, PO header, PO lines, etc. PO line may have a reference to a contract number, include SE Number, if applicable. Commercial Leakage Platform 302 may store the invoice file (step 331) and extract lines (step 333) which may be added to invoice lines (step 334). An invoice header may be created (step 332). If the supplier is enabled for SE creation, a service entry may be created (step 329) and SE batch may be sent (step 330). SE attachments may be stored (step 335), lines may be extracted (step 337) and added to SE lines (step 338). SE header may be created (step 336). Payload may include SE header, SE lines, PO header, PO lines, SE attachments, etc. PO line may have a reference to a contract number. Commercial Leakage Platform 302 may identify contract leakage (step 339) and a message may be sent to a client or entity (step 340).

The entity (executing enterprise resource planning software or platform represented by 306) may determine whether the invoice is approved (step 341). If not, an actionable notification may be sent to a stakeholder (step 342). For example, service entry sheets may require one or more approvals. If yes, a notification may be sent (step 343). The notification may be sent to a stakeholder. This may include material invoices and auto-approved service entry sheets, for example. The client or entity may confirm leakage (step 344) and then revise the ML model as needed (step 346). If leakage is not confirmed, a reason may be captured (step 345) and then used to revise ML model (step 346). The process ends.

Figure 4:
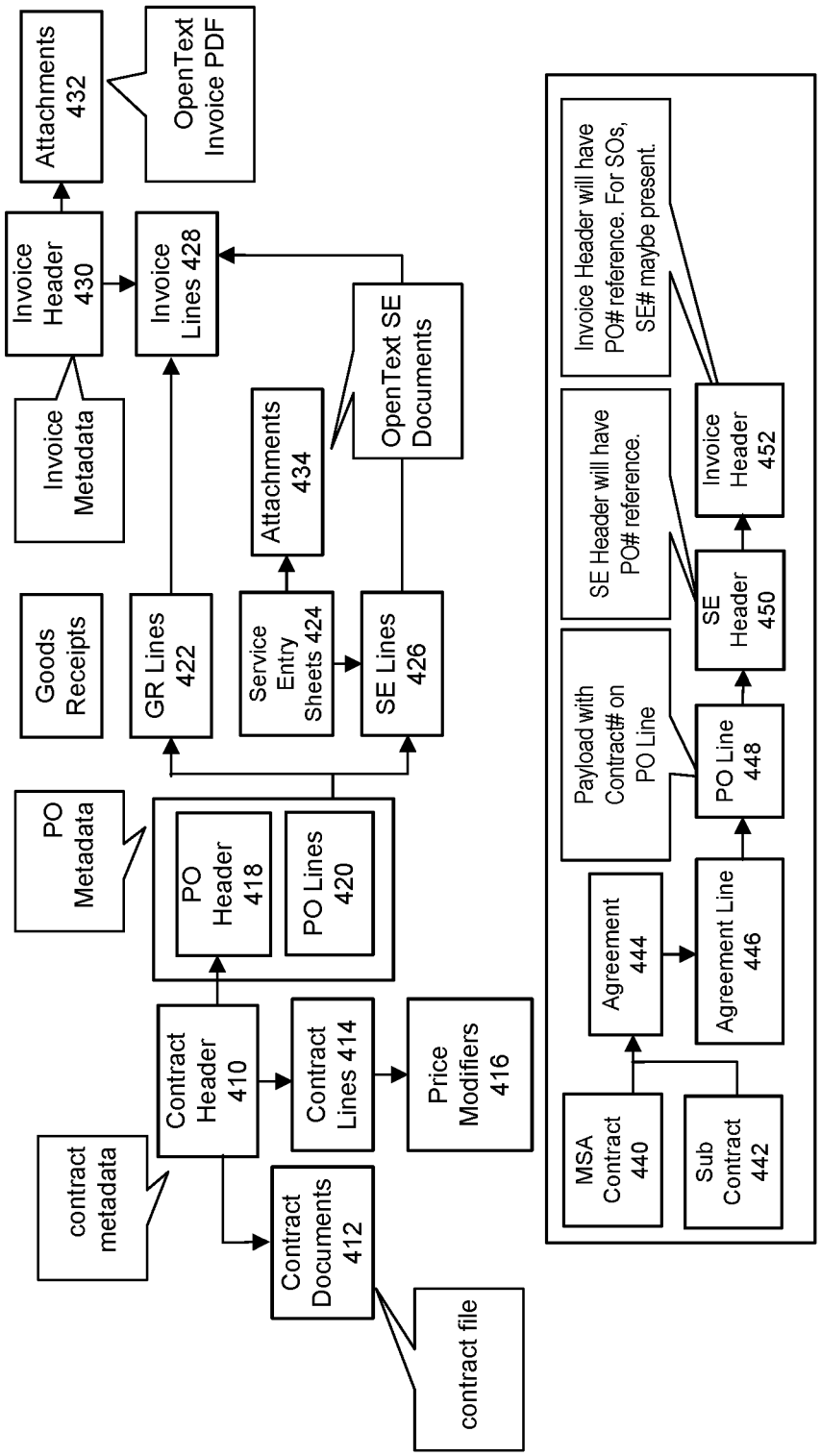
FIG. 4 illustrates a logical data model, according to an embodiment of the present invention.

FIG. 4 illustrates a logical data model, according to an embodiment of the present invention. The exemplary logical data model shows the entities related to various objects such as contract, purchase order, good receipts, service entry sheets and invoices. It also depicts how these entities are related to each other. ERP data from other platforms (e.g., spend management, enterprise resource planning, etc.) may be ingested to this data model along with data extracted using ML model from contracts and invoices.

As shown in FIG. 4, contract objects may include contract header 410, contract documents 412, contract lines 414 and price modifiers 416. PO objects may include PO header 418 and PO lines 420. Good Receipts objects may include GR lines 422, service entry sheets 424 and SE lines 426. Invoice objects may include Invoice Header 430, Invoice Lines 428 and Attachments 432, 434. Other objects may include MSA contract 440, Sub contract 442, Agreement 444, Agreement Line 446, PO Line 448, SE Header 450 and Invoice Header 452. PO Line 448 may represent payload with a contract number. SE Header 450 may have a corresponding PO reference number. Invoice Header 452 may have a PO reference number and a corresponding SE number may be present. For example, the invoice header PO reference number or the SE number may provide connection information to associate those documents to a corresponding contract or agreement.

An embodiment of the present invention is directed to a Price Modifiers Model. The price of a contract line may be modified based on many standard parameters such as date, quantity, location, etc. The pricing model allows for such variation. In addition, the price may also be dependent on attributes that are related to categories. For example, for a particular equipment, the price may be dependent on capacity. The pricing framework allows for modeling such variations as well.

Price Modifiers Model may relate to Contract Line, Standard Price Modifiers, and Extensible Price Modifiers. Contract Line may include: categories, line description, item number, base unit of measure (UOM), price, currency, etc. Standard Price Modifiers may include: UOM, from date, to date, from quantity, to quantity, plant, location, price, modifier—mark up or mark down, percent, market index name, formula, function, etc. Extensible Price Modifiers may relate to categories with a set of attributes.

An embodiment of the present invention may be directed to implementing various types of matching logic. For example, matching logic may provide an exact matching between invoice numbers or PO numbers to associate invoices to their corresponding governing agreements or contract. In this example, one to many or many to one matching may be implemented across standard data model(s). Another example of matching logic may relate to fuzzy string matching to associate invoice line item descriptions to pricing details from a contract, agreement, PO, etc. The matching logic may be applied to invoices, SES, POs and other data to make various determinations. For example, matching logic may perform tasks such as find invoice number associated with SEs number, related purchase order; find contract number from PO; find name from any one document; find line description from invoice; find associated SEs line, PO line; merge the all line descriptions; compare the invoice price and contract price; flag the invoice for manual intervention; task user actions and feedback to ML model. The matching logic may be applied to contracts to perform functions, such as: pick the contract for analysis; filter the contract lines pertaining to a location by matching the location field; match with contract line description, etc. An embodiment of the present invention may further implement a mapping between invoice name to a location on the contract during onboarding.

An embodiment of the present invention may generate and provide various outputs, including dashboards, charts, reports, contract leakage user interface, etc. Dashboards and charts enable users to view overall contract leakage with an ability to slice data by dimensions such contract and supplier and drill down to the specific invoices. Reports may include: single invoice—Rate Discrepancy Report; invoice group—Rebate and Discount Discrepancy Report; single invoice—Duplicate Invoice Lines Report, etc. Reports may also include detailed reports showing invoice lines and associated contract lines that account for contract leakage. The leakage may be caused by rate discrepancy, unapplied discounts and rebates or duplicate invoice lines.

Statistical and true reporting may involve an API to interface data for data analytics purposes.

User Interfaces may illustrate contract leakage for a specific invoice that can be leveraged during review and approval process. User interfaces may also show an output of the extraction of contracts and historical invoices during the onboarding process. ML model may further learn based on user feedback.

Figure 5:
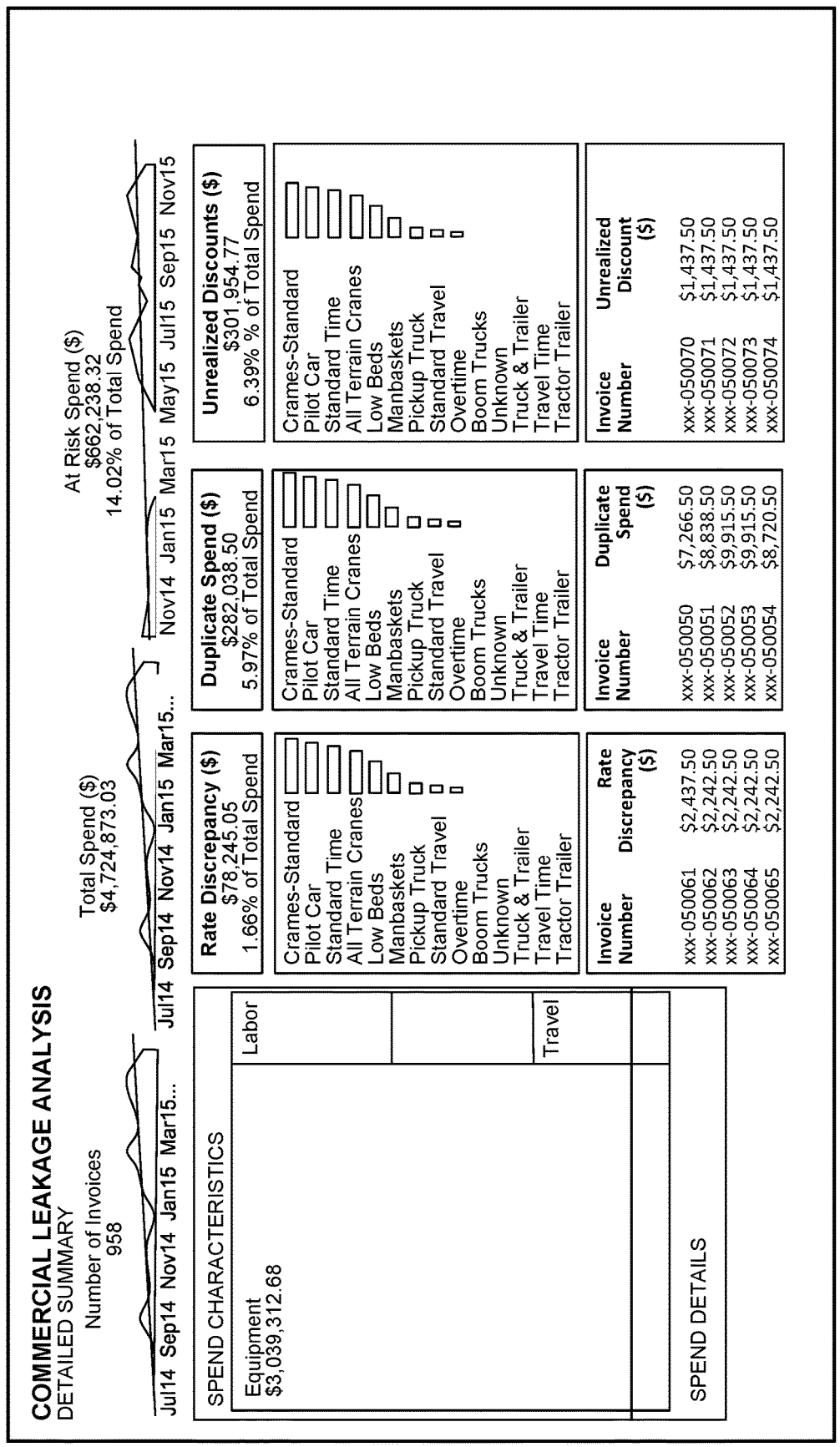
FIG. 5 illustrates an exemplary interface for providing commercial leakage analysis.

FIG. 5 illustrates an exemplary interface for providing commercial leakage analysis. FIG. 5 demonstrates a detailed summary illustrating number of invoices, total spend and at risk spend. Graphics may include spend characteristics by categories, such as equipment, labor and travel. Additional details may include rate discrepancy, duplicate spend and unrealized discounts. Supporting invoice data may be provided and available for access.

FIG. 6 illustrates an exemplary interface for providing commercial leakage analysis and drill down level details. As shown in FIG. 6, users may drill down into supplier and invoice level details. The contract language may be viewed and the actual contract and invoice files may be accessed from the detailed view. As shown in FIG. 6, invoice details may be provided with line item data relating to specific equipment and resources.

FIGS. 7-13 illustrate exemplary user interfaces, according to an embodiment of the present invention.

FIG. 7 is an exemplary invoice view, according to an embodiment of the present invention.

FIG. 8 is an exemplary view of line item details, according to an embodiment of the present invention.

FIG. 9 is an exemplary view of extracted text, according to an embodiment of the present invention. Text and corresponding tags are graphically shown. Tags may include adjectives, adposition, adverb, auxiliary, conjunction, coordinating conjunction, determiner, interjection, noun, numerical, carinal, participle, pronoun, proper noun, punctuation, subordinating conjunction. Other tags may be applied.

FIG. 10 is an exemplary view of table detection, according to an embodiment of the present invention. In this example, a detected table may be highlighted as shown by 1010.

FIGS. 11 and 12 are an exemplary view of Lume data, according to an embodiment of the present invention. Lume may represent a common data format for components and data storage. The standardized Lume format facilitates the processing and analysis of data because a multitude of components can be easily applied and upstream information can be utilized for enhanced processing. Details of the Lume data format are provided in U.S. Pat. No. 10,846,341, the description of which is incorporated herein by reference.

As shown in FIG. 11, payment terms, subtotal and invoice total are selected and highlighted. As shown in FIG. 12, invoice due date and tax rate are selected and highlighted. Visualization details and options may be provided. For example, payment terms may correspond to a common color or graphic. Subtotal and Invoice Total may correspond to other respective colors or graphics.

FIG. 13 is an exemplary view of extraction results, according to an embodiment of the present invention. As shown in FIG. 13, fields are extracted with corresponding content or answers. Other variations in fields and answers/ content may be provided depending on specific applications, industries and/or other use cases and preferences.

As an example, a NLP component may process a Lume data format ("Lume") and add additional Lume Elements to indicate human language specific constructs in the underlying data, including word tokens, part-of-speech, semantic role labels, named entities, co-referent phrases, etc. These elements can be indexed to provide users with the ability to quickly search for a set (or individual) Lume or Lume Elements through a query language.

For example, each Lume Element may include an element ID and an element type. According to a preferred embodiment of the invention, only an element ID and element type are required to define and create a Lume Element. The element ID is a string comprising a unique identifier for the element. The element type is a string that identifies the type of Lume Element. Examples of types of Lume Elements include a part-of-speech (POS) such as noun, verb, adjective; and a named-entity-recognition (NER) such as a person, place or organization. Additionally, file path and file type information can be stored as elements. The file path is a string comprising the full source file path of the document. The file type is a string comprising the file type of the original document.

Although not required, a Lume Element may also include one or more attributes. An attribute is an object comprised of key-value pairs. An example of a key-value pairs might be, for example, {"name":"Wilbur", "age":27}. This creates a simple, yet powerful format that allows the developer flexibility. The reason only the element ID and type are required, according to an exemplary embodiment of the invention, is that it provides flexibility to the developers to store information about a Lume in an element while also ensuring that it's accessible by ID or type. This flexibility allows users to determine how they would like to store relationships and hierarchies among elements according to their domain expertise. For example, elements can contain the necessary information for complicated linguistic structures, store relationships between elements, or refer to other elements.

According to an exemplary embodiment of the invention, the Lume Elements are used to store stand-off annotation format. That is, the elements are stored as annotations separately from the document text, rather than being embedded in the text. According to this embodiment, a System does not modify and can restore the original data.

According to a preferred embodiment, the Lume Elements are not stored in a hierarchical relationship to other Lume Elements, and document data and metadata are stored in a non-hierarchical fashion. Most known formats (other than Lume) are hierarchical, making them difficult to manipulate and convert. Lume's non-hierarchical format allows for easy access to any elements of the document data or its metadata, either at the document level or the text level. In addition, editing, adding, or parsing the data structure can be done via the operations on the elements without the need to resolve conflicts, manage the hierarchy or other operations that may or may not be required for the application. According to this embodiment, because it is a stand-off annotation format, a System can preserve an exact copy of the original data and support overlapping annotations. In addition, this allows for the annotation of multiple formats, such as audio, image and video.

The Lume technology can provide a universal format for document data and metadata. Once the Lume has been created, it can be used in each tool of a natural language processing pipeline without the need for writing format conversions to incorporate tools into the pipeline. This is because the basic conventions required to pass the data and metadata are established by the Lume format. A System provides utilities for extracting document data and metadata from a number of formats, including plain text and Microsoft Word. Format-specific parsers convert the data and metadata from these formats into Lume, and correspondingly write the modified Lume back to the format. The System can use the Lume technology to store information related to families of words to prepare them for natural language processing, such as preprocessing and stemming. In addition, the System can use the Lume technology to store information related to relationships, and graph structures in the document.

According to an exemplary embodiment of the invention, the System includes other components in addition to the Lume and Lume Elements. In particular, the System may be configured to include a dataset, a Lume Data Frame, an Ignite component, and an element index. A dataset is a collection of Lume objects that have a unique identifier. A dataset is typically used to designate training and testing sets for machine learning and can also be used for performing bulk operations on many documents. A Lume Data Frame is a specialized matrix representation of a Lume. Many machine learning and numerical operation components within the System can leverage this optimized format. The System may also include Ignite components that read Lume (or Lume Corpus) data and return Lume (or Lume Corpus) data, usually by processing existing Lume Elements or the original source data and adding new Lume Element objects. An element index is computer object representation of sets or elements and representations typically leveraged in Ignite for efficiency in Lume data and metadata retrieval. For example, some components may be optimized to work over character offsets and therefore an index on character offsets can speed up operations on those components.

According to an exemplary embodiment of the invention, the primary functionalities of the System include data representation, data modeling, discovery and composition, and service interoperability, described as follows.

Data Representation: Lume is the common data format used for storing and communicating analyses on the System. Lume takes a stand-off approach to data representation, e.g., results of analytics are stored as annotations independently of original data. According to one embodiment, Lume is implemented in Python and has computer-object representations as Python objects and is serialized as JavaScript Object Notation ("JSON") for inter-process communication. Lume may be designed for use with web-based specifications, such as JSON, Swagger (YAML), RESTful and will interface with the Python ecosystem, but it can also be implemented in, and support components written in Java and other languages.

Data Modeling: Lume can be designed to be simple and only enforce basic requirements on users of the System. Interpretations and business logic are left to the users of the System rather than requiring declarative representations of both data and processes. The System can be designed to leave the modeling informal and to leave the details for implementations in the processing components. This allows Lume to maintain a very simple specification, and allows it to be extended for specific applications without impeding other applications. For example, when searching the Lume is important, it is integrated with modules that index on top of the Lume structure. When working with a document object model (DOM) is important, the DOM parser stores the addition information in the form of Lume Elements and attributes into the Lume, and converts back out to a DOM model with this information.

Discovery and Composition: Lume may also have an additional design feature relating to analytic process provenance. The System workflows can require provenance information to promote repeatability and discovery of components. This provenance information is stored in Lume and can be enforced though provenance-enforcing workflows. For example, this can provide a check on each of the output Lumes to ensure that the correct processing steps were completed. In the validation stage, it can provide a means to track the provenance of the Lume Element that created the correct or incorrect metadata. Further, it can also track to ensure that all inputs are received as outputs.

Service Interoperability. The services provided by the System may require Swagger (YAML markup language) specifications, according to one embodiment of the invention. There may be many assumptions regarding business logic, order of operations and other data interpretations that are utilized to implement a System component. Identifying which components are interoperable may be achieved through the analysis of example workflows, rather than input and output specifications. In the System, a component may simply operate on a Lume and in the case of error return correct error codes and write the appropriate logging information.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages will be apparent to those skilled in the art from consideration of the specification and practice of the embodiments disclosed herein. The specification and examples should be considered exemplary.

What is claimed is:

1. A computer-implemented system for determining commercial leakage, the system comprising:
    an interface coupled to a plurality of data sources comprising structured data and unstructured data;
    an interactive dashboard configured to display commercial leakage information;
    a memory component that stores and manages contracts and invoices relating to one or more service providers; and
    a computer server comprising a computer processor and learning model, and coupled to the interface and the memory component, the computer processor configured to perform the steps of:
        receiving, via the interface, structured and unstructured contract data relating to one or more contracts;
        receiving, via the interface, structured and unstructured invoice data relating to one or more invoices;
        applying the learning model to the at least one input file, the learning model comprising the steps of:
            extracting a first set of one or more commercial terms from the received structured and unstructured contract data;
            extracting a second set of one or more commercial terms from the received structured and unstructured invoice data;
            generating, for the first set of one or more commercial terms, a first converted file in a data format that is standardized for a plurality of input file types;
            applying one or more price modifiers to one or more pricing terms in the first converted file;
            updating the first converted file based on applied one or more price modifiers;
            generating, for the second set of one or more commercial terms, a second converted file in the data format that is standardized for a plurality of input file types wherein the standardized data format is applicable to a plurality of disparate service providers and includes at least one element wherein the at least one element includes an element identifier and an element type and is stored in a non-hierarchical relationship format to other elements;
            applying a specific ontology to each of the first and second converted files to perform semantic annotation to the first and second converted files;
            generating, based on the semantic annotation, at least one expression, wherein the expression comprises an expression string in a domain-specific language;
            based on the standardized data format and the semantic annotation in the first and second converted files, performing a comparison of the one or more commercial terms to determine one or more differences between commercial terms in the first and second converted files;
            applying the at least one expression to the first and second converted files to generate a response to a question about the determined one or more differences between commercial terms in the first and second converted files;
            generating an output identifying the one or more differences between contract commercial terms and invoice commercial terms and one or more cognitive decisions comprising insights and identification of patterns and anomalies, wherein the output comprises one or more of: an automated response to address the difference and a notification to a subject matter professional; and
            training the learning model with the generated output;
        communicating the generated output to one or more users via the interactive dashboard; and
        applying a resolution to at least one of the one or more differences, the resolution comprising one or more of a refund request and a stop payment action.

2. The system of claim 1, wherein the automated response comprises generating a request for a reissue of a corresponding invoice to address the identified difference.

3. The system of claim 1, wherein the automated response comprises generating a stop order to pay a corresponding invoice.

4. The system of claim 1, wherein the standardized data format applies one or more price modifiers.

5. The system of claim 1, wherein the interface is coupled to an engine that comprises a data quality assurance processor, an optical character recognition processor, a table detection processor, a natural language processor, and a machine learning feature.

6. The system of claim 1, wherein the one or more differences comprises price discrepancies.

7. The system of claim 1, wherein the one or more contracts comprise: master service agreements, addendums, statement of work, change orders and pricing sheets.

8. The system of claim 7, wherein the interactive user interface comprises a rate discrepancy portion, a duplicate spend portion and an unrealized discounts portion.

9. The system of claim 7, wherein the interactive user interface comprises one or more extraction results comprising a set of fields and corresponding answers.

10. The system of claim 1, wherein the output is provided via an interactive user interface.

11. A computer-implemented method for determining commercial leakage, the method comprising the steps of:
    receiving, via an interface, structured and unstructured contract data relating to one or more contracts, wherein the interface is coupled to a plurality of data sources comprising structured data and unstructured data;
    receiving, via the interface, structured and unstructured invoice data relating to one or more invoices;
    extracting a first set of one or more commercial terms from the received structured and unstructured contract data;
    extracting a second set of one or more commercial terms from the received structured and unstructured invoice data;
    converting the first set of one or more commercial terms into a standardized data format;
    applying one or more price modifiers to one or more pricing terms in the standardized first set of one or more commercial terms;
    updating the standardized first set of one or more commercial terms based on applied one or more price modifiers;
    converting the second set of one or more commercial terms into the standardized data format wherein the standardized data format is applicable to a plurality of disparate service providers and includes at least one element wherein the at least one element includes an element identifier and an element type and is stored in a non-hierarchical relationship format to other elements;

applying a specific ontology to each of the first and second converted files to perform semantic annotation to the first and second converted files;

generating, based on the semantic annotation, at least one expression, wherein the expression comprises an expression string in a domain-specific language;

based on the standardized data format and the semantic annotation in the first and second converted files, performing, via a learning algorithm implemented by a processor, a comparison of the one or more commercial terms to determine one or more differences between contract commercial terms and invoice commercial terms;

applying, via the learning algorithm, the at least one expression to the first and second converted files to generate a response to a question about the determined one or more differences between commercial terms in the first and second converted files;

generating, via the learning algorithm, an output identifying the one or more differences between contract commercial terms and invoice commercial terms and one or more cognitive decisions comprising insights and identification of patterns and anomalies, wherein the output comprises one or more of: an automated response to address the difference and a notification to a subject matter professional;

communicating the generated output to one or more users via an interactive dashboard; and applying a resolution to at least one of the one or more differences, the resolution comprising one or more of a refund request and a stop payment action.

12. The method of claim 11, wherein the automated response comprises generating a request for a reissue of a corresponding invoice to address the identified difference.

13. The method of claim 11, wherein the automated response comprises generating a stop order to pay a corresponding invoice.

14. The method of claim 11, wherein the standardized data format applies one or more price modifiers.

15. The method of claim 11, wherein the interface is coupled to an engine that comprises a data quality assurance processor, an optical character recognition processor, a table detection processor, a natural language processor, and a machine learning feature.

16. The method of claim 11, wherein the one or more differences comprises price discrepancies.

17. The method of claim 11, wherein the one or more contracts comprise: master service agreements, addendums, statement of work, change orders and pricing sheets.

18. The method of claim 17, wherein the interactive user interface comprises a rate discrepancy portion, a duplicate spend portion and an unrealized discounts portion.

19. The method of claim 17, wherein the interactive user interface comprises one or more extraction results comprising a set of fields and corresponding answers.

20. The method of claim 11, wherein the output is provided via an interactive user interface.

* * * * *